US012443921B2

(12) United States Patent
Puerini et al.

(10) Patent No.: US 12,443,921 B2
(45) Date of Patent: Oct. 14, 2025

(54) ITEM TRANSITIONS

(71) Applicant: Amazon Technologies, Inc., Seattle, WA (US)

(72) Inventors: Gianna Lise Puerini, Seattle, WA (US); Dilip Kumar, Seattle, WA (US); Steven Kessel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/647,990

(22) Filed: Apr. 26, 2024

(65) Prior Publication Data

US 2024/0420080 A1    Dec. 19, 2024

Related U.S. Application Data

(60) Division of application No. 17/408,305, filed on Aug. 20, 2021, now Pat. No. 12,002,009, which is a continuation of application No. 16/235,200, filed on Dec. 28, 2018, now Pat. No. 11,100,463, which is a continuation of application No. 14/495,818, filed on Sep. 24, 2014, now Pat. No. 10,176,456, which is a continuation-in-part of application No. 13/928,345, filed on Jun. 26, 2013, now Pat. No. 10,268,983.

(51) Int. Cl.
*G06Q 10/00* (2023.01)
*G06Q 10/0875* (2023.01)

(52) U.S. Cl.
CPC ............... *G06Q 10/0875* (2013.01)

(58) Field of Classification Search
CPC .................................. G06Q 10/0875
See application file for complete search history.

(56) References Cited

U.S. PATENT DOCUMENTS

| 6,236,736 | B1 | 5/2001 | Crabtree et al. |
| 6,529,855 | B1 | 3/2003 | Gu |
| 6,659,344 | B2 | 12/2003 | Otto et al. |

(Continued)

FOREIGN PATENT DOCUMENTS

| CA | 2474254 A1 | 7/2003 |
| CN | 101149792 B | 6/2010 |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Rokib Masud
(74) *Attorney, Agent, or Firm* — Athorus, PLLC

(57) ABSTRACT

This disclosure describes a system for automatically transitioning items from a materials handling facility without delaying a user as they exit the materials handling facility. For example, while a user is located in a materials handling facility, the user may pick one or more items. The items are identified and automatically associated with the user at or near the time of the item pick. When the users enters and/or passes through a transition area, the picked items are automatically transitioned to the user without affirmative input from or delay to the user.

21 Claims, 9 Drawing Sheets

(56) References Cited

U.S. PATENT DOCUMENTS

| | | | |
|---|---|---|---|
| 7,225,980 B2 | 6/2007 | Ku et al. | |
| 7,522,057 B2 | 4/2009 | Stern et al. | |
| RE41,085 E * | 1/2010 | Anthonyson | G07B 15/02 |
| | | | 705/13 |
| 7,693,758 B1 | 4/2010 | Bacco et al. | |
| 7,949,568 B2 | 5/2011 | Fano et al. | |
| 7,983,448 B1 | 7/2011 | Lobo et al. | |
| 8,009,864 B2 | 8/2011 | Linaker et al. | |
| 8,094,026 B1 | 1/2012 | Green | |
| 8,175,925 B1 | 5/2012 | Rouaix | |
| 8,189,855 B2 | 5/2012 | Opalach et al. | |
| 8,264,422 B1 | 9/2012 | Persson et al. | |
| 8,423,431 B1 | 4/2013 | Rouaix et al. | |
| 8,571,702 B1 | 10/2013 | Haake et al. | |
| 8,630,924 B2 | 1/2014 | Groenevelt et al. | |
| 8,678,281 B2 | 3/2014 | Kangas et al. | |
| 8,688,598 B1 | 4/2014 | Shakes et al. | |
| 8,726,195 B2 | 5/2014 | Bill | |
| 9,235,928 B2 | 1/2016 | Medioni et al. | |
| 9,473,747 B2 | 10/2016 | Kobres et al. | |
| 10,250,939 B2 | 4/2019 | Tegreene et al. | |
| 2002/0113123 A1 | 8/2002 | Otto et al. | |
| 2003/0002712 A1 | 1/2003 | Steenburgh et al. | |
| 2004/0181467 A1 | 9/2004 | Raiyani et al. | |
| 2005/0006569 A1 | 1/2005 | Yoshiyuki | |
| 2005/0189412 A1 | 9/2005 | Hudnut et al. | |
| 2006/0206235 A1 | 9/2006 | Shakes et al. | |
| 2006/0256082 A1 | 11/2006 | Cho et al. | |
| 2008/0019589 A1 | 1/2008 | Yoon et al. | |
| 2008/0055087 A1 | 3/2008 | Horii et al. | |
| 2008/0055194 A1 | 3/2008 | Baudino et al. | |
| 2008/0059570 A1 | 3/2008 | Bill | |
| 2008/0068170 A1 | 3/2008 | Ehrman et al. | |
| 2008/0077511 A1 | 3/2008 | Zimmerman | |
| 2008/0109114 A1 | 5/2008 | Orita et al. | |
| 2008/0183326 A1 | 7/2008 | Danelski | |
| 2008/0260212 A1 | 10/2008 | Moskal et al. | |
| 2008/0285791 A1 | 11/2008 | Suzuki et al. | |
| 2009/0003709 A1 | 1/2009 | Kaneda et al. | |
| 2009/0066513 A1 | 3/2009 | Kondo et al. | |
| 2009/0121017 A1 | 5/2009 | Cato et al. | |
| 2009/0179734 A1 | 7/2009 | Do et al. | |
| 2009/0245573 A1 | 10/2009 | Saptharishi et al. | |
| 2010/0117959 A1 | 5/2010 | Hong et al. | |
| 2010/0134611 A1 | 6/2010 | Naruoka et al. | |
| 2010/0138037 A1 | 6/2010 | Adelberg et al. | |
| 2010/0191124 A1 | 7/2010 | Prokoski | |
| 2010/0277277 A1 | 11/2010 | Green et al. | |
| 2011/0011936 A1 | 1/2011 | Morandi et al. | |
| 2011/0242025 A1 | 10/2011 | Wen et al. | |
| 2011/0295644 A1 | 12/2011 | Hara et al. | |
| 2012/0206603 A1 | 8/2012 | Rekimto et al. | |
| 2012/0284132 A1 | 11/2012 | Kim et al. | |
| 2013/0021262 A1 | 1/2013 | Chen | |
| 2013/0027561 A1 | 1/2013 | Lee et al. | |
| 2013/0035950 A1 | 2/2013 | Macdonald et al. | |
| 2013/0054333 A1 | 2/2013 | Ross et al. | |
| 2013/0057670 A1 | 3/2013 | Fukuda | |
| 2013/0060577 A1 | 3/2013 | DeBusk et al. | |
| 2013/0076898 A1 * | 3/2013 | Philippe | G16H 40/20 |
| | | | 348/143 |
| 2013/0110565 A1 | 5/2013 | Means, Jr. et al. | |
| 2013/0126611 A1 | 5/2013 | Kangas et al. | |
| 2013/0147839 A1 | 6/2013 | Fukushima et al. | |
| 2013/0253700 A1 | 9/2013 | Carson et al. | |
| 2013/0265232 A1 | 10/2013 | Yun et al. | |
| 2013/0284806 A1 | 10/2013 | Margalit | |
| 2013/0290106 A1 | 10/2013 | Bradley et al. | |
| 2014/0019264 A1 | 1/2014 | Wachman et al. | |
| 2014/0164176 A1 | 6/2014 | Kitlyar | |
| 2014/0244429 A1 | 8/2014 | Clayton et al. | |
| 2014/0244447 A1 | 8/2014 | Kim et al. | |
| 2014/0244488 A1 | 8/2014 | Kim et al. | |
| 2014/0253429 A1 | 9/2014 | Dai et al. | |
| 2014/0279294 A1 | 9/2014 | Field-Darragh et al. | |
| 2014/0279713 A1 | 9/2014 | Calman et al. | |
| 2014/0344118 A1 | 11/2014 | Parpia et al. | |
| 2014/0362223 A1 | 12/2014 | LaCroix et al. | |
| 2015/0012426 A1 | 1/2015 | Purves et al. | |
| 2015/0019391 A1 | 1/2015 | Kumar et al. | |
| 2015/0073907 A1 | 3/2015 | Purves et al. | |
| 2015/0074615 A1 | 3/2015 | Han et al. | |
| 2015/0206081 A1 | 7/2015 | Lee et al. | |
| 2015/0208043 A1 | 7/2015 | Lee et al. | |

FOREIGN PATENT DOCUMENTS

| | | |
|---|---|---|
| CN | 101976377 A | 2/2011 |
| JP | H0281806 A | 3/1990 |
| JP | 2000123086 A | 4/2000 |
| JP | 2001092975 A | 4/2001 |
| JP | 2001128814 A | 5/2001 |
| JP | 2002284317 A | 10/2002 |
| JP | 2002316706 A | 10/2002 |
| JP | 2005029391 A | 2/2005 |
| JP | 2006204473 A | 8/2006 |
| JP | 2009008966 A | 1/2009 |
| JP | 2009169951 A | 7/2009 |
| JP | 2009251625 A | 10/2009 |
| JP | 2011054038 A | 3/2011 |
| JP | 2011253344 A | 12/2011 |
| JP | 2012028948 A | 2/2012 |
| JP | 2012074014 A | 4/2012 |
| JP | 2013033512 A | 2/2013 |
| JP | 2013054593 A | 3/2013 |
| WO | 2010004719 A1 | 1/2010 |
| WO | 2013016803 A1 | 2/2013 |
| WO | 2013033442 A1 | 3/2013 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

Extended European Search report for EP Application No. EP 14 81 7650 dated Sep. 16, 2016.

Extended European Search report for EP Application No. EP 22201572.9 dated Feb. 9, 2023.

International Search Report and Written Opinion of PCT Application No. PCT/US2014/039474, dated Oct. 17, 2014.

International Search Report and Written Opinion of PCT Application No. PCT/US2014/043033, dated Oct. 29, 2014.

Vaive Kalnikaite et al., "How to Nudge In Situ: Designing Lambent Devices to Deliver Information Salience in Supermarkets", Ubicomp '11 Proceedings of the 13th International Conference on Ubiquitous Computing, 2011, pp. 11-20, Publisher: ACM New York, NY, USA.

* cited by examiner

ITEM TRANSITIONS

CROSS-REFERENCE TO RELATED APPLICATIONS

This application is a Divisional of U.S. Pat. No. 12,002,009, filed Aug. 20, 2021, entitled "Transitioning Items From A Materials Handling Facility," which is a Continuation of U.S. Pat. No. 11,100,463, filed Dec. 28, 2018, entitled "Transitioning Items From A Materials Handling Facility," which is a is Continuation of U.S. Pat. No. 10,176,456, filed Sep. 24, 2014, entitled "Transitioning Items From A Materials Handling Facility," which is a Continuation-In-Part of U.S. Pat. No. 10,268,983, filed Jun. 26, 2013, entitled "Detecting Item Interaction And Movement," each of which are incorporated herein by reference in their entirety.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in a storage area, or fulfillment centers, that can be used to replenish inventory located in the shopping areas and/or to satisfy orders for items that are placed through other channels (e.g., e-commerce). Other examples of entities that maintain inventory include libraries, museums, rental centers, and the like. In each instance, the user (e.g., picker, user, customer) must first locate the item and retrieve the item for use and/or purchase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
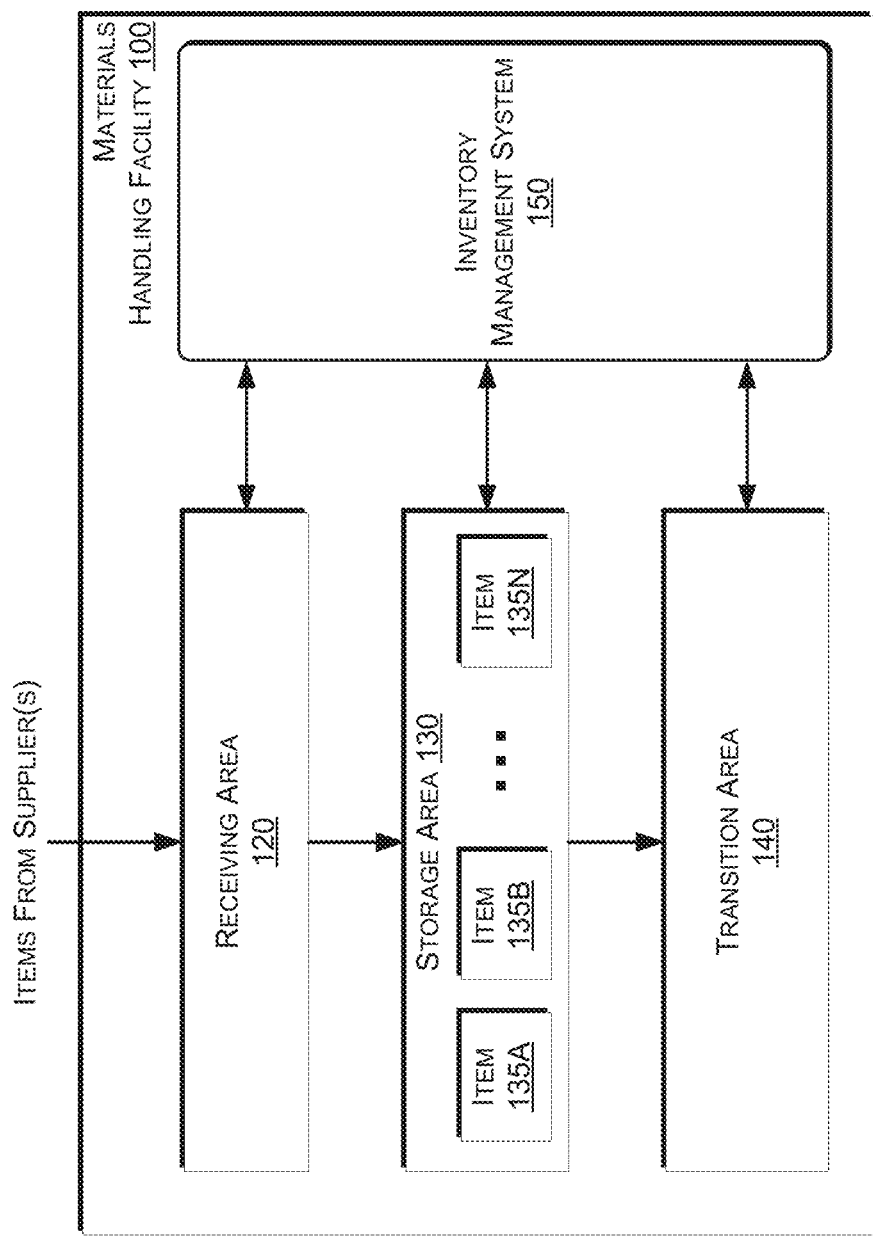
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system for tracking and identifying the removal of items from inventory locations and the transition of items from a materials handling facility. In some instances, a user may remove an item from an inventory location within the materials handling facility. Upon detecting the removal, the removed item is identified and included on an item identifier list associated with the user that removed the item. For example, if the user is a picking agent, the picking agent may have an associated item identifier list identifying all the items that the picking agent has picked from various inventory locations located in the materials handling facility.

Likewise, if the user places an item at a location within the materials handling facility, the item is identified and the item identifier list associated with the user is updated. For example, if the user is a stowing agent, the stowing agent may have an associated item identifier list identifying all the items that the stowing agent is to stow into inventory locations within the materials handling facility. When the stowing agent places an item into an inventory location, the item is identified and the item identifier list is updated to indicate that the stowing agent has stowed that item.

If the user enters or passes through a transition area, such as a rebin station, another inventory location, pack station, shipping, exit from the materials handling facility, etc., the items identified on the item identifier list may be transitioned. Because the items have already been identified, the transition may be done automatically without any affirmative input from the user or delay to the user. For example, if the user, such as a shipping agent, is exiting the materials handling facility with the items, the user will pass through a transition area (such as a loading door, a door exiting the materials handling facility, etc.) as they exit the materials handling facility. When the user enters or passes through the transition area, the items identified on the item identifier list are automatically transitioned from the materials handling facility to the user. Continuing with the above example, the items may be automatically transitioned from the materials handling facility to the shipping agent in response to a determination that the shipping agent has passed through the transition area. As another example, if the transition area is a rebin station within the materials handling facility, the items may be transitioned from the original storage location to the rebin station. As still another example, if the materials handling facility is a retail location and the customer is purchasing items, when the customer passes through the exit (transition area) of the retail location, the items picked by the user may be automatically transitioned from the materials handling facility to the user and the user may be charged a fee for the items. In a similar manner, if the materials handling facility is a rental location, a library, etc., the transition area may be near the exit of the facility. When the user leaves with items, the items are transitioned from the materials handling facility to the user that is taking the items. In such a case, a rental or borrow time identifying when the items are to be returned may be associated with the items and the user. The transition of the items may be done automatically and without any affirmative input or delay to the user. For example, if the user is purchasing items from a retail location, rather than the user having to stop and "check out" with a cashier, teller or automated check station, because the picked items are already known and identified on an item identifier list associated with the user, the user may simply exit the retail location with the items. The exit of the user will be detected and, as the user passes through the exit (transition area), the user, without having to stop or otherwise be delayed, will automatically be charged a fee for the items (the items are transitioned to the user).

In some implementations, the identity of items picked and/or placed into inventory locations within the materials handling facility may be identified based on data received from a variety of input devices. For example, an image capture device (e.g., a camera) may capture a series of images of a user's hand before the hand crosses a plane into the inventory location and also capture a series of images of the user's hand after it exits the inventory location. Based on a comparison of the images, it can be determined whether the user picked an item from the inventory location or placed an item into the inventory location. For example, based on an analysis of the images, it can be determined that the user is not holding an item when the hand crosses the plane into the inventory location but is holding an item when the hand is removed from the inventory location (the user picked an item from the inventory location). Likewise, image analysis can be used to identify if the user is holding an item in their hand before the hand crosses into the inventory location but is not holding an item when the hand is removed from the inventory location (the user placed an item into the inventory location).

In examples where it is determined that a user has picked an item from the inventory location, it can be determined what items were stocked, stored or otherwise associated with the inventory location and the item identifier list may be updated to identify that the user has picked one of the items associated with that inventory location. By having knowledge of the items stored at an inventory location, actual identification of the picked item through processing of the captured images is not necessary. Simple and quick processing to detect that an item has been picked is sufficient. However, in some implementations, additional image processing may be performed to confirm that the picked item corresponds to the item associated with the inventory location prior to the item identifier list being updated.

In examples where it is determined that a user has placed an item into the inventory location, it can be determined what items were associated with the user prior to the placement of the item into the inventory location. Likewise, a stored representation of each of those items may be retrieved and compared with an image of the placed item in an effort to identify the placed item. If a high confidence score is determined from a comparison of the stored representations and the image of the placed item, the placed item may be identified as the item and the item identifier list may be updated to indicate that the user has placed the item. A further determination may also be made as to whether the placed item corresponds with or is otherwise supposed to be located at the inventory location. If the placed item is supposed to be at that inventory location, a stock quantity for that item at that inventory location may be updated. However, if the placed item does not belong at that inventory location, an associate may be dispatched to retrieve the item from the inventory location.

By detecting the pick and/or placement of items by users in the materials handling facility, the movement of items within and exiting the materials handling facility may be accomplished without requiring the user to undergo additional processing of the items. For example, if the materials handling facility is a retail store, users may pick items from within the facility, place the items into a cart, bag, pocket, or otherwise carry the items and the items are automatically identified and associated with the user. When the user exits the facility, the items may be transitioned from the facility to the user and the user charged a fee for the items. This may be done without the user having to undergo the additional step of checking out with a cashier, the cashier identifying and scanning each item and the user paying the cashier for the items.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to store and manage inventory items is illustrated in FIG. 1. As shown, a materials handling facility 100 includes a receiving area 120, a storage area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, storage areas 130 and transition areas 140 may be interspersed rather than segregated. Additionally, the materials handling facility 100 includes an inventory management system 150 configured to interact with each of receiving area 120, storage area 130, transition area 140 and/or users within the materials handling facility 100.

The materials handling facility 100 may be configured to receive different kinds of inventory items 135 from various suppliers and to store them until a user orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135, such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms, such that all items 135 of a given kind are stored in one inventory location within the storage area 130. In other implementations, like items 135 may be stored in different locations. For example, to optimize retrieval of certain items 135 having high turnover within a large physical facility, those items 135 may be stored in several different inventory locations to reduce congestion that might occur at a single point of storage. In general, the inventory management system 150 may maintain a mapping or location information identifying where within the materials handling facility each item is stored. Each inventory item may be associated with the corresponding inventory location in which it is stored and the association may be maintained in an inventory data store 915 (FIG. 9) accessible by the inventory management system 150.

When a customer order specifying one or more of items 135 is received, or as a user progresses through the materials handling facility 100, the corresponding items 135 may be selected or "picked" from inventory locations within the storage area 130. For example, in one implementation, a user may have a list of items to pick and may progress through the materials handling facility picking items 135 from the inventory locations within the storage area 130. In other implementations, materials handling facility employees may pick items 135 from inventory locations within the storage area 130 using written or electronic pick lists derived from customer orders.

As discussed in more detail below, one or more images of the user may be captured. For example, when the user reaches an inventory location and passes their hand into an inventory location within the storage area 130, one or more images may be captured of the user's hand prior to it passing into the inventory location. Again, when the user's hand is removed from the inventory location, one or more images may be captured of the user's hand as it exits the inventory location. Those images may be compared to determine whether a user has picked an item from the inventory location or placed an item in the inventory location. In some implementations, a simple image analysis may be performed to determine changes between the images. For example, image analysis may be performed on the first image to determine a skin tone color of the user's hand and pixels including that color, or a range of colors similar to the identified skin tone color, may be identified to represent the user's hand. Utilizing the skin tone colors, the images of the user's hand obtained after the user's hand is removed from the inventory location may be processed to again identify the user's hand. Finally, a comparison of the segments of the images representing the user's hand and an area surrounding the user's hand may be compared to determine a change between the images to identify whether an item has been picked or placed into the inventory location. In another example, item recognition may be performed on both images to identify different items. For example, the image(s) captured prior to the user's hand entering the inventory location may only include an item that is in the shape of a hand. In comparison, the image(s) captured after the user's hand is removed from the inventory location may include an object in the shape of the user's hand plus an additional item. It will be appreciated that any image analysis and/or comparison technique may be used to determine if a user has placed and/or picked an item from an inventory location.

When a user enters or passes through a transition area 140, the items identified on the item identifier list associated with the user may be transitioned. A transition area may be any designated area within, around or near a materials handling facility. For example, the transition area may be a packing station within the materials handling and, when the user arrives at the packing station (transition area), the items identified on the item identifier list associated with the user may be transitioned from the storage area 130 to the packing station. Such information may be maintained by the inventory management system 150 to enable accurate tracking of items. Other examples of a transition area include, but are not limited to, exits from the materials handling facility, a perimeter surrounding the materials handling facility, a loading bay of the materials handling facility, a parking lot associated with the materials handling facility, and the like.

If the items are departing the materials handling facility (e.g., a carrier is taking the items for transport, a customer is purchasing or renting the items), when the user passes through the exit (transition area) of the materials handling facility, the items identified on the item identifier list are transitioned from the materials handling facility to the user. For example, if the user is purchasing the items, the ownership of the items may be transferred to the user and the user charged a fee for the items when the user exits the materials handling facility with the items.

Figure 2:
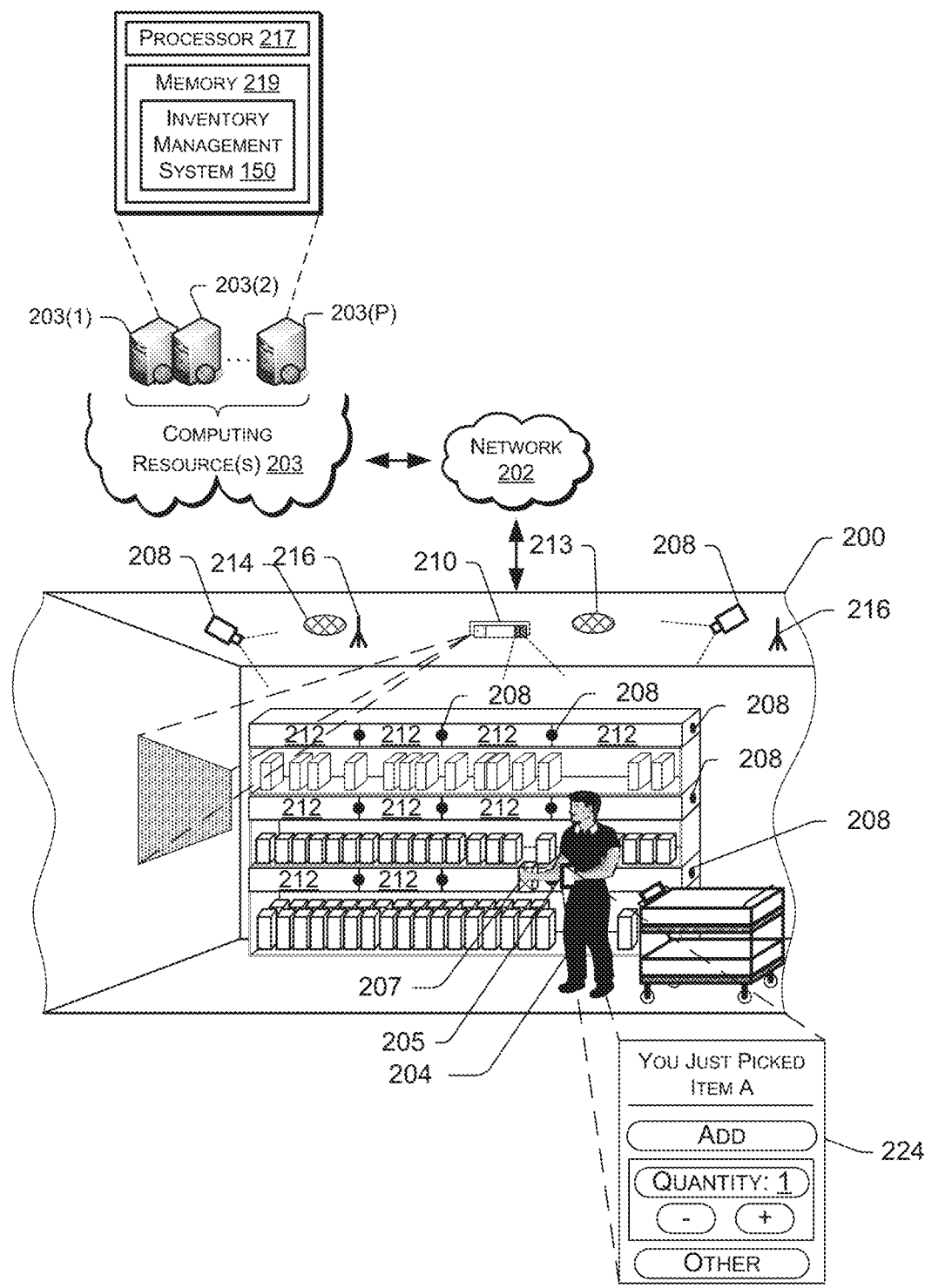
FIG. 2 is a block diagram illustrating additional details of a materials handling facility, according to some implementations.

FIG. 2 shows additional components of a materials handling facility 200, according to some implementations. Generally, the materials handling facility 200 may include one or more image capture devices, such as cameras 208. For example, one or more cameras 208 may be positioned in locations of the materials handling facility 200 so that images of locations within the materials handling facility can be captured. In some implementations, the image capture devices 208 may be positioned overhead, such as on the ceiling, to capture images of users and/or locations within the materials handling facility. In addition, in some implementations, one or more cameras 208 may be positioned on or inside of inventory locations. For example, a series of cameras 208 may be positioned on external portions of the inventory locations and positioned to capture images of users and/or the location surrounding the inventory location. Likewise, one or more cameras 208 may be positioned within the inventory locations to capture images of items stored in the inventory locations and/or images of objects (e.g., a user's hand, items) moving into and/or out of the inventory locations. Cameras may also be positioned at or near transition areas to capture images of users as they enter or pass through the transition area.

Any type of camera and/or configuration of cameras may be used with the implementations described herein. For example, one or more of the cameras may be RGB cameras. In other implementations, one or more of the cameras may be depth sensing cameras.

In addition to cameras, other input devices, such as pressure sensors, infrared sensors, a scale, load cells, a volume displacement sensor, a light curtain, etc., may be utilized with the implementations described herein. For example, a pressure sensor and/or a scale may be used to detect when an item is added and/or picked from inventory locations. Likewise, an infrared sensor may be used to distinguish between a user's hand and inventory items. In another example, load cells may be positioned on a surface of the transition area to detect when a user is passing through the transition area.

In some implementations, a user 204 located in the materials handling facility 200 may possess a portable device 205 and obtain information about items 207 located within the materials handling facility 200 via the portable device. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device 205 may operate in conjunction with or may otherwise utilize or communicate with one or more components of the inventory management system 150. Likewise, components of the inventory management system 150 may interact and communicate with the portable device 205 as well as identify the user, communicate with the user via other means and/or communicate with other components of the inventory management system 150.

The inventory management system 150 may also include other input/output devices, such as projectors 210, displays 212, speakers 213, microphones 214, etc., to facilitate communication between the inventory management system 150 and the user 204. In some implementations, multiple input/output devices may be distributed within the materials handling facility. Likewise, the inventory management system 150 may also include one or more communication devices, such as wireless antennas 216 that facilitate wireless communication (e.g., Wi-Fi, Near Field Communication (NFC), Bluetooth) between the inventory management system 150 and the portable device 205. The inventory management system 150 may also include one or more computing resource(s) 203 that may be local to the environment (e.g., materials handling facility), remote from the environment, or any combination thereof.

The inventory management system 150 may utilize antennas 216 within the materials handling facility to create a local wireless network 202 (e.g., Wi-Fi) so that the portable device 205 can connect to and communicate with the inventory management system 150. Likewise, in instances when one or more of the components of the inventory management system 150 are remote from the materials handling facility, they may communicate with other components of the inventory management system 150 and/or the portable device 205 via the network 202.

The following is an example use case of a user entering a materials handling facility, picking an item from an inventory location of the materials handling facility and exiting the materials handling facility with the item. Upon entering the materials handling facility, the inventory management system 150 may identify the user (e.g., facial recognition, user ID card, user provided information). Upon identifying the user, information (e.g., item retrieval history, view history, purchase history, user profile, payment information) may be retrieved from a data store. Likewise, the user may provide to the inventory management system 150 and/or have an associated pick list (item identifier list) identifying items to be retrieved from the materials handling facility retrieved from a data store.

In some implementations, as the user progresses through the materials handling facility 200, imaging devices 208 may obtain/capture one or more images of the user 204 and provide the image(s) to the computing resource(s) 203, which may include a processor 217 and/or a memory 219, for processing. For example, an image of a user's hand just before it crosses a plane into an inventory location and an image of the user's hand just after it is removed from the inventory location may be captured and provided to the computing resource(s) 203. The computing resource(s) 203 may process the images to determine whether an item has been picked and/or placed into the inventory location. If it is determined that an item has been picked from the inventory location, the inventory management system may obtain an identification of the inventory item stored at the inventory location and include an item identifier for that inventory item in an item identifier list associated with the user to identify that the user has picked the item from the inventory location. Likewise, an inventory quantity for the inventory item at that inventory location may be decreased to reflect that the item has been picked from the inventory location.

In another example, if the inventory management system 150 cannot identify the item the user picked from the inventory location, the inventory management system 150 may utilize other information about the user (e.g., past purchase history, currently picked items) to assist in identifying the item. For example, if the inventory management system cannot determine if the picked item is a bottle of ketchup or a bottle of mustard, the inventory management system may consider past purchase history and/or what items the user has already picked from other inventory locations. For example, if the user historically has only picked/purchased ketchup, that information may be used to confirm that the user has likely picked ketchup from the inventory location.

In some implementations, data from other input devices may be used to assist in determining the identity of items picked and/or placed in inventory locations. For example, if it is determined that an item is placed into an inventory location, in addition to image analysis, a weight of the item may be determined based on data received from a scale, pressure sensor, load cell, etc., located at the inventory location. The image analysis may be able to reduce the list of potentially matching items down to a small list. The weight of the placed item may be compared to a stored weight for each of the potentially matching items to identify the item that was actually placed in the inventory location. By combining multiple inputs, a higher confidence score can be generated increasing the probability that the identified item matches the item actually picked from the inventory location and/or placed at the inventory location. In another example, one or more radio frequency identifier ("RFID")

readers may collect or detect an RFID tag identifier associated with an RFID tag included in the item.

An RFID tag generally refers to a device with an antenna or resonator that can produce a wireless signal when activated or powered. The wireless signal produced by the RFID tag is typically low power, and intended for transmission over short distances. The RFID tag may be formed of any material and may be flexible or rigid. In some implementations, the RFID tag may include an adhesive on a portion of the exterior of an RFID tag surface to enable attachment of the tag to an item, such as an inventory item. For example, an RFID tag may be an active RFID tag in which the RFID tag includes an internal power supply (e.g., battery), a passive RFID tag in which the RFID tag does not include a power supply and is activated by power supplied by an RFID reader, a battery-assisted RFID tag in which the RFID tag includes a power supply (battery) but is activated by power supplied by an RFID reader, an active near field communication ("NFC") tag, a passive NFC tag, a Bluetooth tag, or any other type of tag that can be configured to provide an identifier over a radio frequency. Likewise, an RFID reader, as used herein, refers to any type of RFID reader that can communicate with, interrogate and/or receive information from an RFID tag.

If information is presented to the user from the inventory management system 150, such information may be presented via the portable device 205 and/or other output devices positioned within the materials handling facility. The portable device may be used to identify to the user a confirmation of the item picked from the inventory location and/or to request that the user identify the inventory item picked/placed into the inventory location. For example, if the identity of a picked inventory item is confirmed but the inventory management system 150 cannot determine with a high degree of accuracy the number of inventory items picked, the inventory management system may provide item information to the user via the portable device 205 and request that the user identify the quantity picked. For example, the portable device may identify that the user has picked item A from the inventory location. The user may then confirm whether the item is to be added to the item identifier list and/or how many of those items are to be added to the item identifier list associated with the user, via the control 224. Other information and/or options relating to an item may also be presented to the user.

When the user exits the materials handling facility, the user passes through a transition area. Rather than requiring that the user stop and confirm the items picked that the user is removing from the materials handling facility, the user may simply depart the materials handling facility with the picked items. Because the picked items have already been identified and included on the item identifier list associated with the user, there is no need for the user to stop and confirm the picked items before departing. When the user passes through the transition area (e.g., exit of the materials handling facility), the user is identified and the items identified on the item identifier list are transferred from the materials handling facility to the user. For example, the inventory quantity for the materials handling facility may be decremented, the user may be charged for the items, and the items may be associated with a purchase history of the user. Likewise, the user may receive a notification, such as an electronic message, identifying the items that have been transitioned to the user and/or purchased by the user. The electronic message may be transmitted to an e-mail address of the user, presented on the portable device 205 associated with the user, etc.

Figure 3:
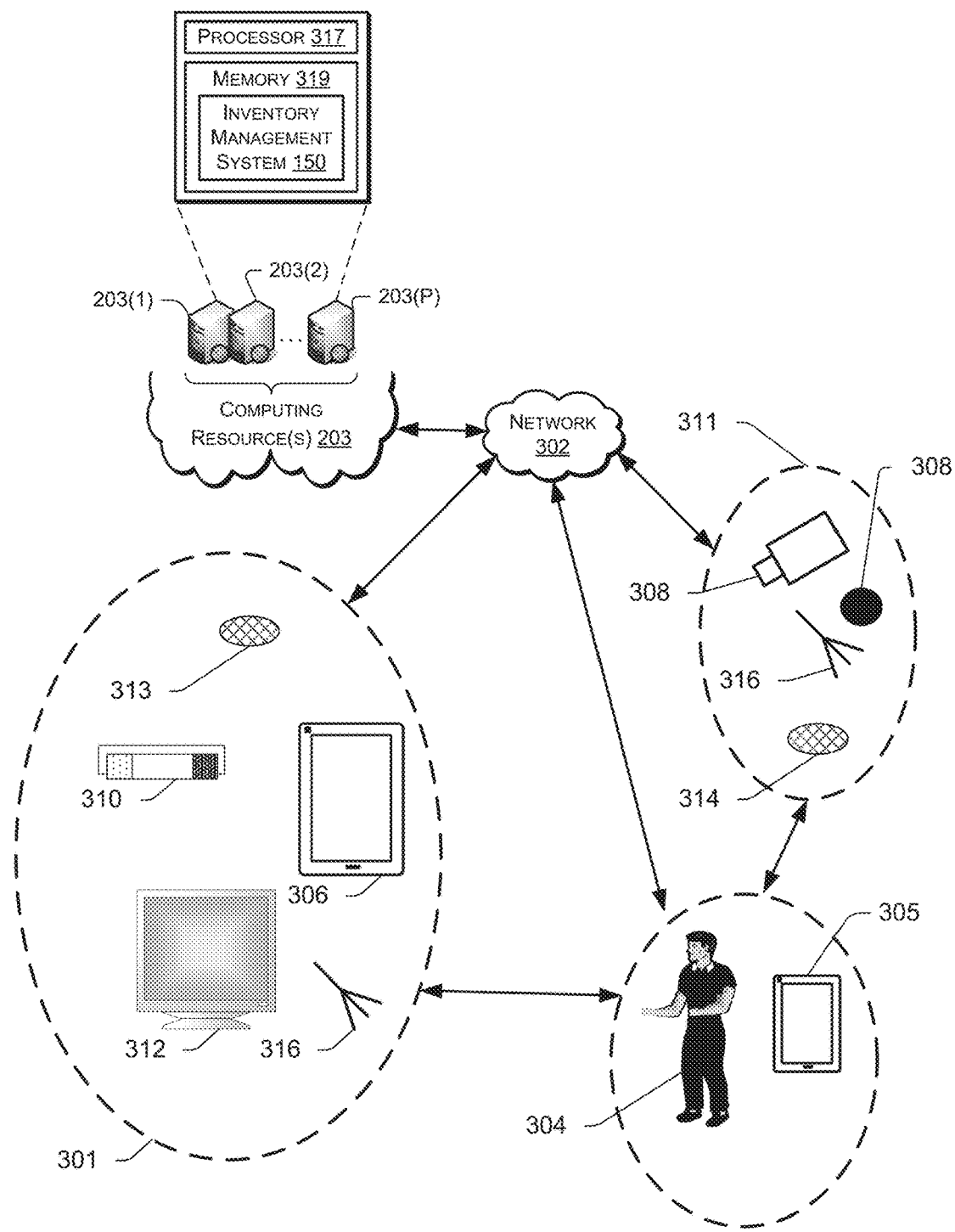
FIG. 3 shows additional components and communication paths between component types utilized in a materials handling facility of FIG. 1, according to some implementations.

FIG. 3 shows additional components and communication paths between component types utilized in an inventory management system 150 of FIG. 1, in accordance with some implementations. As discussed above, the portable device 305 may communicate and interact with various components of an inventory management system 150 over a variety of communication paths. Generally, the inventory management system 150 may include input components 311, output components 301 and computing resource(s) 203. The input components 311 may include an image capture device 308 (e.g., camera), microphone 314, antenna 316, sensor (not shown), scale (not shown), light curtain (not shown), a volume displacement sensor (not shown) or any other component that is capable of receiving input about the surrounding environment, from the user of the portable device and/or from the portable device. The output components 301 may include a projector 310, a portable device 306, a display 312, an antenna 316, a radio (not shown), speakers 313 and/or any other component that is capable of providing output.

The inventory management system 150 may also include computing resource(s) 203. The computing resource(s) 203 may be local to the environment (e.g., materials handling facility), remote from the environment, or any combination thereof. Likewise, the computing resource(s) 203 may be configured to communicate over a network 302 with input components 311, output components 301 and/or directly with the portable device 305 and/or the user 304.

As illustrated, the computing resource(s) 203 may be remote from the environment and implemented as one or more servers 203(1), 203(2), . . . , 203(P) and may, in some instances, form a portion of a network-accessible computing platform implemented as a computing infrastructure of processors, storage, software, data access, and so forth that is maintained and accessible by components/devices of the inventory management system 150 via a network 302, such as the Internet. For example, the computing resources 203 may process images to determine whether an item has been picked from an inventory location or placed into an inventory location. The computing resource(s) 203 do not require end-user knowledge of the physical location and configuration of the system that delivers the services. Common expressions associated for these remote computing resource(s) 203 include "on-demand computing," "software as a service (SaaS)," "platform computing," "network-accessible platform," "cloud services," "data centers," and so forth.

Each of the servers 203(1)-(P) include a processor 317 and memory 319, which may store or otherwise have access to an inventory management system 150, which may include or provide image processing (e.g., for user identification and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
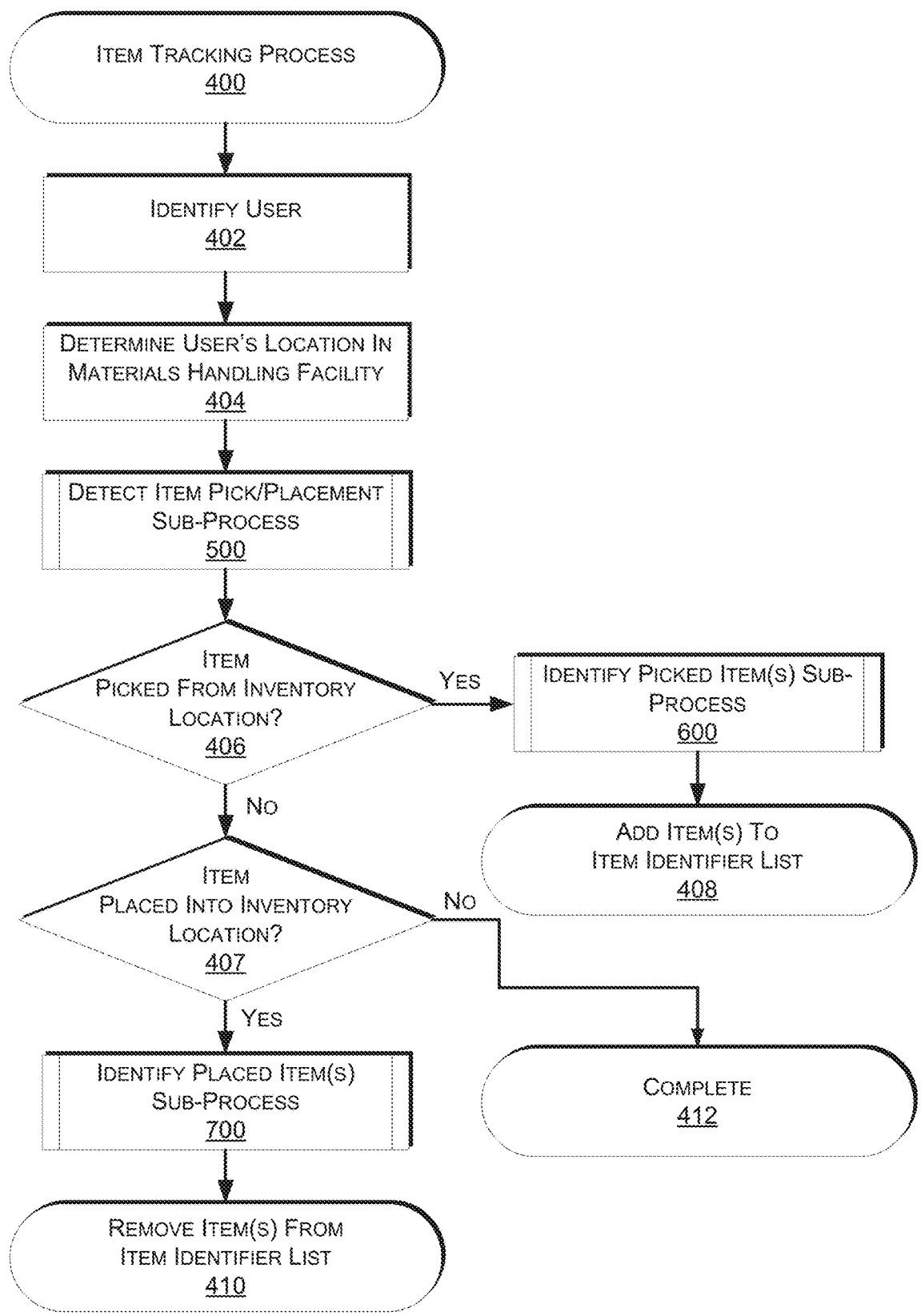
FIG. 4 depicts a flow diagram of an example process for tracking interaction and/or movement of an item, according to some implementations.

FIG. 4 depicts a flow diagram of an example process 400 for tracking interaction and/or movement of an item, according to some implementations. The process of FIG. 4 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins by identifying a user, as in 402. Various techniques may be used to identify a user. For example, image capture and facial recognition may be used. In another example, the user may identify themself with a personal identifier (e.g., badge), RFID card, etc. In some implementations, the user has a portable device that may be detected when the user enters the materials handling facility. Alternatively, an application executing on a portable device may be utilized by the user to identify themselves. The portable device and/or application may include a unique identifier that is provided to the inventory management system 150 and used to identify the user. When the user is identified, a user profile associated with the user and maintained by the inventory management system is determined. In some implementations, a payment instrument (e.g., credit card, debit card, check card, etc.) is associated with the user profile and may be checked to confirm that the payment instrument is valid and may be used by the user to pay for any items picked by the user.

In addition to identifying the user, the user's location within the materials handling facility and identification of the inventory location within the user's location may also be determined, as in 404. In some implementations, imaging devices located within the materials handling facility may be used to capture images within the materials handling facility that are processed by the computing resource(s) 203 to identify the location of the user. Likewise, microphones may record sounds made by the user and the computing resource(s) may process those sounds to determine a location of the user. For example, based on knowledge of the locations of the microphones within the materials handling facility, a time offset between audio signals received by each microphone can be computed to determine a location of the user.

In order to identify the time offsets between signals received by various microphones, in some instances, the computing resource(s) 203 compile each audio signal received by respective audio transducers and then determine the time offsets between the signals by, for instance, using any time-difference-of-arrival ("TDOA") technique, or any other suitable technique. After identifying the respective time offsets, the computing resource(s) 203 can determine a direction and/or source location of the audio.

In addition to, or as an alternative to visual and/or audio location determination, the inventory management system 150 may also utilize other techniques, such as triangulation between antennas 216, to determine the location of the user as the user moves through the materials handling facility. In other examples, if the user is carrying a portable device that includes a global positioning system (GPS) chip, the inventory management system may be configured to receive the GPS information and determine the location of the portable device, and thus the user.

The example process may also detect whether an item was picked from an inventory location or placed into an inventory location, as in sub-process 500. The sub-process 500 for determining if an item has been picked from an inventory location or placed into an inventory location is discussed in further detail below with respect to FIG. 5. As discussed below, in some implementations, it may be determined that both an item has been placed into the inventory location and an item has been picked from the inventory location. For example, a user may place an item into the inventory location and during the same action pick an item from the inventory location.

Based on the response from the example sub-process 500, a determination is made as to whether an item was picked from the inventory location, as in 406. If it is determined that an item was picked from the inventory location, the sub-process for identifying the picked item is performed, as in 600. The example sub-process 600 for determining an identity of an item picked from the inventory location is discussed further below with respect to FIG. 6. Following completion of the sub-process 600 for determining an identity of the picked item, the example process 400 adds an item identifier representative of the picked item to the item identifier list associated with the user, as in 408. For example, the user profile data store 917 and/or the item identifier list data store 919 may be updated to associate the item identifier representative of the picked item with the user profile of the user that picked the item.

Returning to decision block 406, if it is determined that an item has not been picked from the inventory location, a determination is made as to whether an item was placed into the inventory location, as in 407. If it is determined that an item was placed into the inventory location, the identity of the item is determined, as in sub-process 700. The example sub-process 700 for determining an identity of an item placed into an inventory location is discussed further below with respect to FIG. 7.

Once the identity of the item placed into the inventory location is determined, an item identifier representative of the item is removed from the item identifier list associated with the user, as in 410. The item identifier may be removed from the item identifier list because the user has picked the item from their tote, cart, bag, etc., and placed it back into an inventory location. For example, the user profile data store 917 and/or the item identifier list data store 919 may be updated to remove an association between the item identifier and a user profile associated with the user.

Returning to decision block 407, if it is determined that an item has not been placed into the inventory location (i.e., an item has neither been picked from the inventory location nor placed into the inventory location), the example process 400 completes, as in 412.

In some implementations, item identifiers may be added to an item identifier list associated with a user in response to the user receiving an item. For example, if an item be prepared by a second user (e.g., packing agent) and provided to the user, the item identifier representative of the item is added to the item identifier list. In one implementation, the second user may confirm to the inventory management system 150 that the item has been provided to the user and the item identifier representative of the item is added to the item identifier list associated with the user. In still another example, the user may select an item that is, at a later point in time, delivered or otherwise provided to the user. Upon selection and/or delivery of the item, an item identifier representative of the item may be added to the item identifier list associated with the user. For example, if the user selects a large item that will be shipped to a user specified location or retrieved by the user after the user leaves the materials handling facility, an item identifier representative of the selected item may be added to the item identifier list associated with the user.

While the above example describes the process of placing or picking an item from the inventory location being performed serially, in other implementations, the blocks 406, 407, 408, 410 and sub-processes 600, 700 may be performed in parallel. For example, if the example sub-process 500 determines that a user has both placed an item into the inventory location and picked an item from the inventory location, the following sub-processes 600, 700 may be performed in parallel.

By identifying items picked from inventory locations and/or placed at inventory locations concurrently with the pick or place of these items, an item identifier list associated with the user is kept current. The user may view and/or access the item identifier list at any time to confirm the picked items and/or to identify other items to be picked. Likewise, if the user exits the materials handling facility, rather than the user having to stop and have the picked items identified and confirmed, the user can proceed without stopping or other delay because the items picked by the user are already known and can be automatically transitioned to the user without any affirmative input from the user. For example, if the user is a customer at a retail location (materials handling facility), rather than having to "check out" with a teller or clerk that identifies each picked item and then charges the customer for the picked items, the user may simply exit the retail location. The inventory management system will detect that the user has passed through a transition area and charge a fee to the user for picked items that the user has removed from the retail location. For example, the user may have a credit card, debit card or other payment instrument associated with a user profile maintained by the inventory management system for the user that may be utilized to charge a fee to the user for the picked items. Likewise, the inventory management system may provide an electronic message to the user confirming the picked items and/or the amount of the fee charged for the picked items. Inventory transition is discussed in further detail below with respect to FIG. 8.

Figure 5:
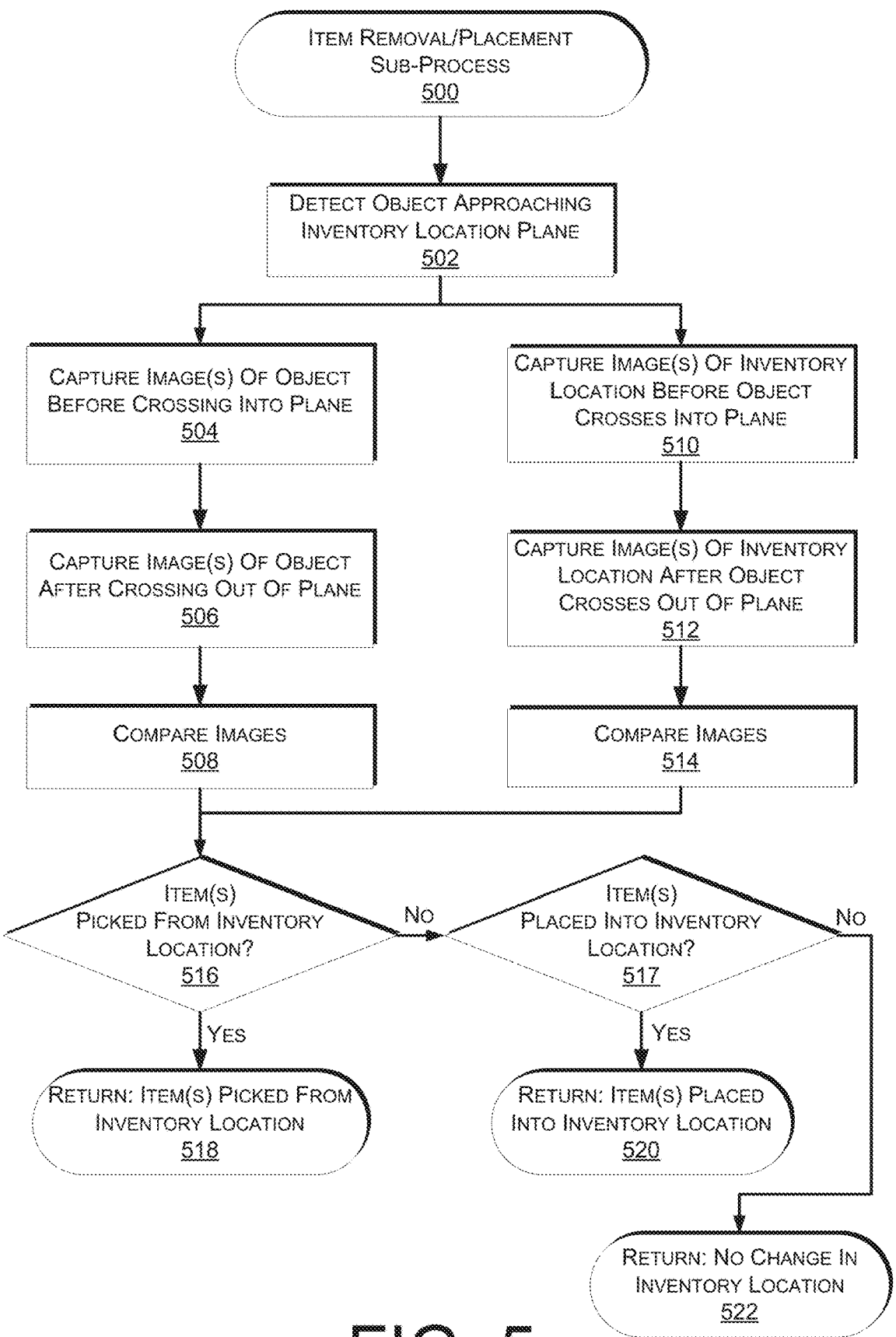
FIG. 5 depicts a flow diagram of an example item pick/placement sub-process, according to some implementations.

FIG. 5 depicts a flow diagram of an example item pick/placement sub-process 500, according to some implementations. The example sub-process 500 begins by detecting an object, such as a user's hand approaching the vertical plane representing the face or front edge of the inventory location, as in 502. One or more input devices (e.g., camera) located within the materials handling facility may collect images (data) of the location that includes the inventory location that are used to detect the object. In other examples, data may be collected by a light curtain or other presence detection device and used to detect the object. In general, data is collected by at least one input device of the plurality of input devices located in the materials handling facility and used to determine that an object is approaching the inventory location.

Upon detecting an object approaching the inventory location and before the object crosses the plane into the inventory location, one or more images (data) are captured that include the object, as in 504. Subsequently, and after the item is picked from the inventory location, one or more of the input devices capture one or more images (data) that include the object and/or the picked item, as in 506. In some implementations, the one or more images of the object before the object enters the inventory location and/or after the object is removed from the inventory location may be a series of images that make up a video.

The image(s) captured before the object entered the inventory location and the image(s) captured after the object is picked from the inventory location are then compared, as in 508. For example, a pixel similarity may be performed on the images to identify similar content. For example, if the object is a user's hand, pixels of a similar color matching a color palette typically associated with skin tones may be identified and determined to represent the user's hand. By performing this pixel analysis on both images captured before the object enters the inventory location and images captured after the object exits the inventory location, the same object (in this example the user's hand) may be identified in each image. Based on this information, surrounding pixels may be compared between the images to determine if an object was either included in the user's hand when it went into the inventory location and/or whether an item was included in the user's hand when it was picked from the inventory location.

For example, pixels of a similar color and shape included in the images captured before the user's hand entered the inventory location may be detected and determined to represent an object. If those similar pixel shapes and/or colors are not identified in the image(s) captured after the user removes their hand from the inventory location, it may be determined that the user has placed an item into the inventory location.

Likewise, if only the user's hand is identified in images captured before the user's hand is placed into the inventory location and pixels representing a distinct shape are identified in the image(s) captured when the user removes their hand from the inventory location, it may be determined that the user has picked an item from the inventory location.

Returning to block 502, in some implementations, one or more processes of capturing images may be performed to provide further information for determining if an item has been picked from an inventory location or placed into an inventory location. For example, the example sub-process may also utilize one or more cameras located within the inventory location to capture one or more images of inventory stored at the inventory location before the object crosses into the inventory location, as in 510. For example, images of inventory stored in the inventory location may be periodically captured and stored in an inventory data store accessible by the inventory management system 150.

After an object (e.g., user's hand) has moved into and out of the inventory location, one or more images of the inventory location may be captured, as in 512. The image(s) representing the inventory stored in the inventory location prior to the object entering the inventory location and the images representing the inventory stored in the inventory location after the object exits the inventory location may be compared to determine if an item has been added to or picked from the inventory location, as in 514.

In some implementations, because inventory items are generally stationary when stored in the inventory location, a simple image comparison from a fixed position camera may be performed to determine changes between the images and thus a determination made as to whether one or more items have been picked from the inventory location and/or whether one or more items have been added to the inventory location. This may be particularly useful when it is difficult to determine, based on images of the object moving into and out of the inventory location, how many items were picked and/or placed into the inventory location. For example, if the inventory includes bags of chips and the user removes multiple bags of chips by grabbing the tops of the bags together, it may be difficult to determine from the images captured from outside the inventory location how many bags were picked. However, because the bags are stationary when stored in the inventory location, a quantity of bags stored in the inventory location may be determined by capturing one or more images of the inventory location, processing those images to identify shapes of objects and comparing the number of shapes with the quantity of inventory located at that inventory location. Each shape may then be associated with an item of inventory. Likewise, additional information, such as the stored dimension values for the inventory items, may also be utilized to assist in determining the number of items located in the inventory location. In a similar fashion, images captured after the inventory items have been picked may be captured and processed to identify the number of objects included in those images. By comparing the before and after quantity count of items identified in the images, it may be determined how many items were picked from the inventory location.

While the example sub-process 500 illustrates image capture and comparison steps 504-508 being performed in parallel with the image capture and comparison steps 510-514, in other implementations, only one of the series of steps may be performed. In other implementations, the sets of steps may be performed serially.

Utilizing the comparison of the images, a determination may be made as to whether one or more items were picked from the inventory location, as in 516, and/or placed into the inventory location, as in 517. If it is determined that one or more items were picked from the inventory location, the example sub-process returns an indicator that an item(s) has been picked from the inventory location. If it is determined that an item has not been picked from the inventory location, a determination is made as to whether one or more items have been placed into the inventory location, as in 517. If it is determined that one or more items have been placed into the inventory location, the example sub-process 500 returns an indication that an item(s) has been placed into the inventory location, as in 520. As noted above, it may be determined that an item has been placed into the inventory location and another item has been picked from the inventory location. In such an instance, blocks 518 and 520 may both be completed and information regarding both occurrences may be returned.

Finally, if it is determined that an item has not been placed into the inventory location (i.e., an item has not been picked from the inventory location or placed into the inventory location), the example sub-process 500 returns an indication that there has been no change in the inventory location, as in 522.

Figure 6:
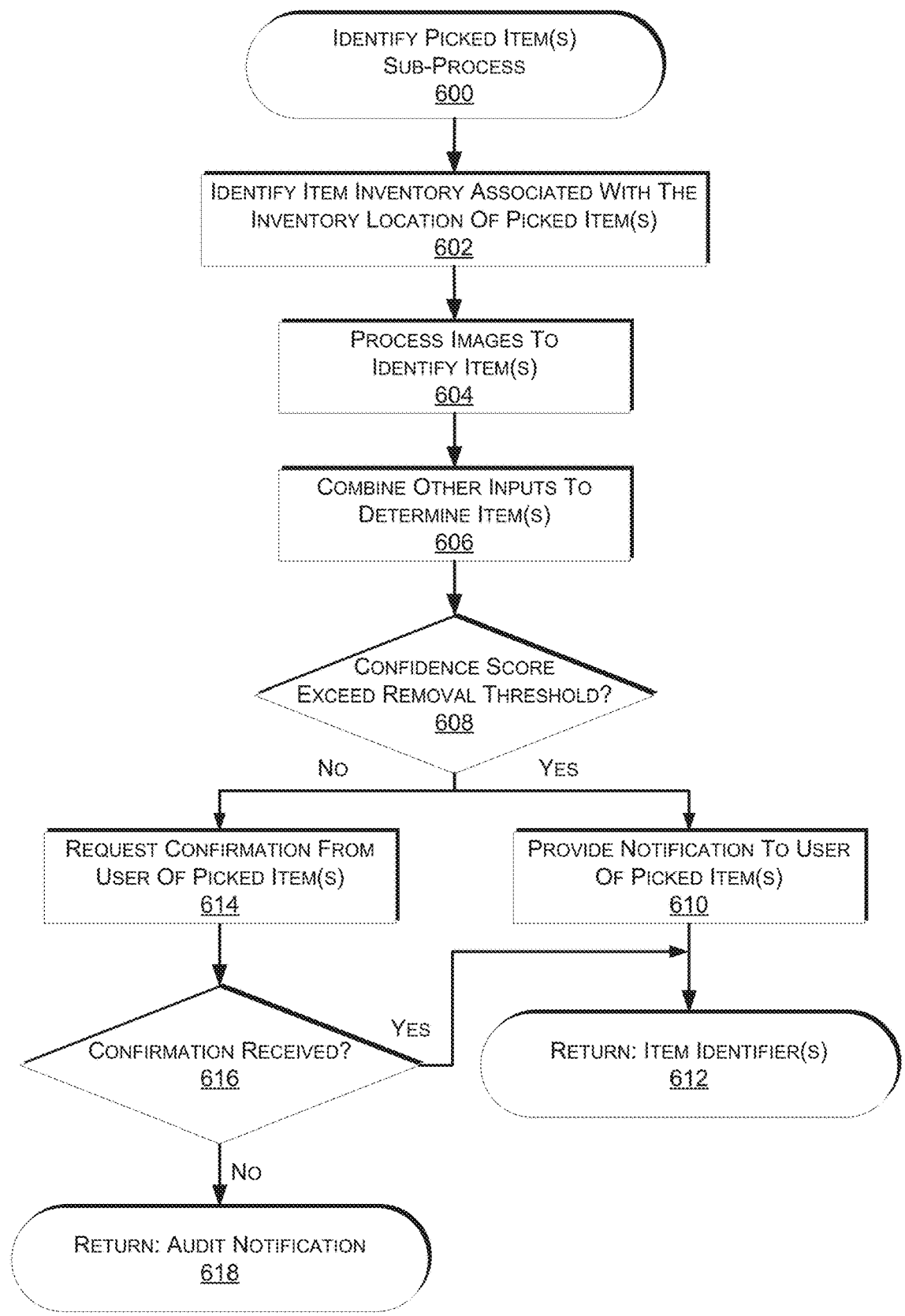
FIG. 6 depicts a flow diagram of an example sub-process for identifying a picked item, according to some implementations.

FIG. 6 depicts a flow diagram of an example sub-process 600 for identifying a picked item, according to some implementations. The example sub-process 600 begins by identifying item inventory associated with the inventory location of the picked item, as in 602. As discussed above, the inventory management system may store inventory information for each inventory location, identifying the inventory items and quantity of inventory items stored at each inventory location. In addition to identifying the inventory associated with the inventory location, in some implementations, one or more of the images captured in steps 504-506, 510-512 (FIG. 5) may be processed to identify the item that has been picked from inventory to confirm that the inventory item associated with the inventory location corresponds with the item identified in the images. For example, in some implementations, image processing may be performed on the collected images (data) to identify the item included in the images and/or to identify features of the item. Such information may be compared to stored information about the inventory item to confirm whether the captured image of the item corresponds with the information for inventory items associated with the inventory location.

In some implementations, data collected by other input devices may also be considered to determine the identity of the item that was picked from the inventory location, as in 606. For example, in some implementations, a change in a pressure sensor and/or weight sensor may be received and compared with a stored weight for inventory items located at the inventory location.

Based on the information utilized to determine the identity of the item picked from the inventory location, a confidence score may be determined identifying how probable it is that the identified item corresponds with the item actually picked from the inventory location. A determination may then be made as to whether the confidence score exceeds a pick threshold, as in 608. The pick threshold may be any defined number to be exceeded before the identified item is determined to correspond with the item actually picked from the inventory location.

If it is determined that the confidence score exceeds the pick threshold, a notification may be provided to the user identifying the item the user has picked from the inventory location, as in 610. As discussed above, the notification may be presented on a display located on or near the inventory location, presented on a portable device in possession of the user, projected onto a surface near the user, etc. Likewise, the example sub-process 600 also returns an identification of the item picked from the inventory location, as in 612.

However, if it is determined that the confidence score does not exceed the pick threshold, a request that the user confirm the identity of the picked item may be presented to the user, as in 614. For example, the example sub-process 600 may present to the user (e.g., via a display, portable device, projection, audible) the item or items that it believes were picked and request that the user confirm the identity of the actually picked item. Likewise, if the example sub-process 600 is not able to determine a number of items picked from the inventory location, a request may be presented asking the user to confirm a number of items picked from the inventory location. In some implementations, if the suggested item does not correspond to the item actually picked, the user can interact with the inventory management system to identify the actual picked item and/or the quantity of picked items.

In some implementations, in addition to or instead of presenting the item to the user, the captured images may be provided to an associate that reviews the images to identify the placed and/or picked item. If the associate can determine the identity of the item, a request may not be sent to the user and instead the item identifier of the identified item may be returned, as in 612.

After presenting the request to the user, a determination may be made as to whether the user provided the requested confirmation, as in 616. If it is determined that the user has provided a confirmation, the example sub-process proceeds to block 612 and continues as discussed above. However, if the user does not provide a confirmation, the example sub-process 600 may return an audit notification indicating to the inventory management system that the user needs to be audited prior to the inventory transitioning within or from the materials handling facility, as in 618. In some implementations, the audit notification may result in an associate being dispatched to the user to confirm the identity of the item picked from the inventory location.

Figure 7:
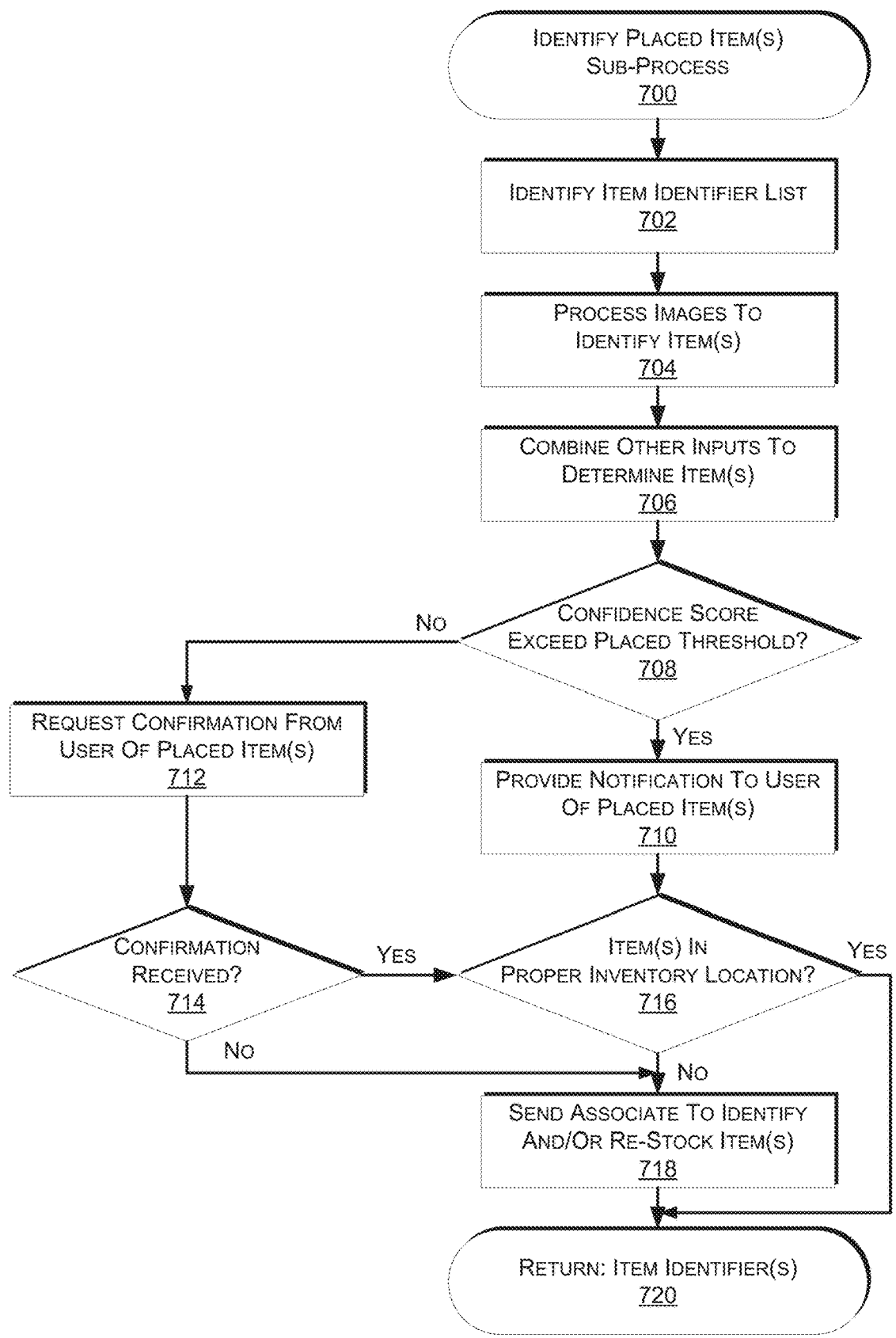
FIG. 7 depicts a flow diagram of an example sub-process for identifying a placed item, according to some implementations.

FIG. 7 depicts a flow diagram of an example sub-process 700 for identifying a placed item, according to some implementations. The example sub-process 700 begins by identifying items identified in the item identifier list associated with the user, as in 702. As discussed above, the item identifier list identifies items that the user has picked from inventory locations while in the materials handling facility and may be stored in the user profile data store 917 and/or the item identifier list data store 919. In addition, images captured at blocks 504-506, 510-512 (FIG. 5) may be further processed to detect an identity of an item placed into an inventory location. For example, the images may be processed to detect a size or shape of an item, a color of an item, characters or other identifying information for the item, etc., as in 704. The detected information may then be compared with information stored for each of the items included in the item identifier list to determine items that the user has potentially placed into the inventory location. For example, if the item identifier list identifies a bottle of ketchup, a bag of chips, a gallon of milk, a screw driver, and a soda bottle, stored information for each of those items may be retrieved and used to compare with the information detected from the processed images in an effort to determine which item identified in the item identifier list was placed into the inventory location.

In addition to comparing information determined from the captured images, the example sub-process may also combine data collected by other input devices to determine an identity of the item, as in 706. Continuing with the above example, the inventory location may include a scale, and a weight of the item placed into the inventory location can be determined. The determined weight may then be compared with weights stored for each item included in the item identifier list to identify those that potentially correspond with the item placed into the inventory location. As another example, the inventory location may include a pressure sensor that can detect a shape or dimension of the bottom of the item as it sits on the pressure sensor. The shape of the bottom of the item may be compared with stored dimension information for each item on the item identifier list.

Based on the gathered information about the item placed into the inventory location, a confidence score may be determined representing a probability that the identified item represents the item actually placed into the inventory location. A determination may then be made as to whether the confidence score exceeds a placed item threshold, as in 708. Similar to the picked item threshold, the placed item threshold may be any defined score or value.

If it is determined that the confidence score exceeds the placed item threshold, a notification is provided to the user identifying the item that the user placed into the inventory location, as in 710. However, if the confidence score does not exceed the placed item threshold, a request may be presented asking the user to confirm the identity of the item placed into the inventory location, as in 712. For example, the example sub-process 700 may present to the user the identity of item(s) that it believes may have been placed into the inventory location. Likewise, the example sub-process 700 may request that the user identify a quantity of items placed into the inventory location.

A determination may then be made as to whether a confirmation was received from the user, as in 714. If it is determined that a confirmation was received, or after providing a notification to the user of the item placed into the inventory location, a determination is made as to whether the identified item is in the proper inventory location, as in 716. As discussed above, the inventory management system 150 may maintain inventory in specific inventory locations throughout the materials handling facility. If an item is placed into an inventory location that does not typically store that inventory item, it may be determined that the placed item is not in the proper inventory location. In other implementations, inventory may be placed in any inventory location. In such a representation, the decision block 716 may not be considered.

If it is determined that the identified item is not in the proper inventory location, or if it is determined that the user did not confirm an identity of the item placed into the inventory location, an associate may be dispatched to the inventory location to retrieve and/or identify the placed item, as in 718. In some implementations, the associate may be a human. In other implementations, the associate may be an automated drive unit and/or a robot configured to manage and/or handle inventory.

If it is determined that the placed item is in the proper inventory location and/or after dispatching an associate to retrieve the inventory item, the example sub-process 700 may return an identification of the placed inventory item, as in 720. In instances where the example sub-process was not able to identify the item placed into the inventory location such that the confidence score exceeded the placed item threshold and the user did not provide a confirmation of the item's identity, block 720 may be delayed until the dispatched associate has identified the placed item.

Figure 8:
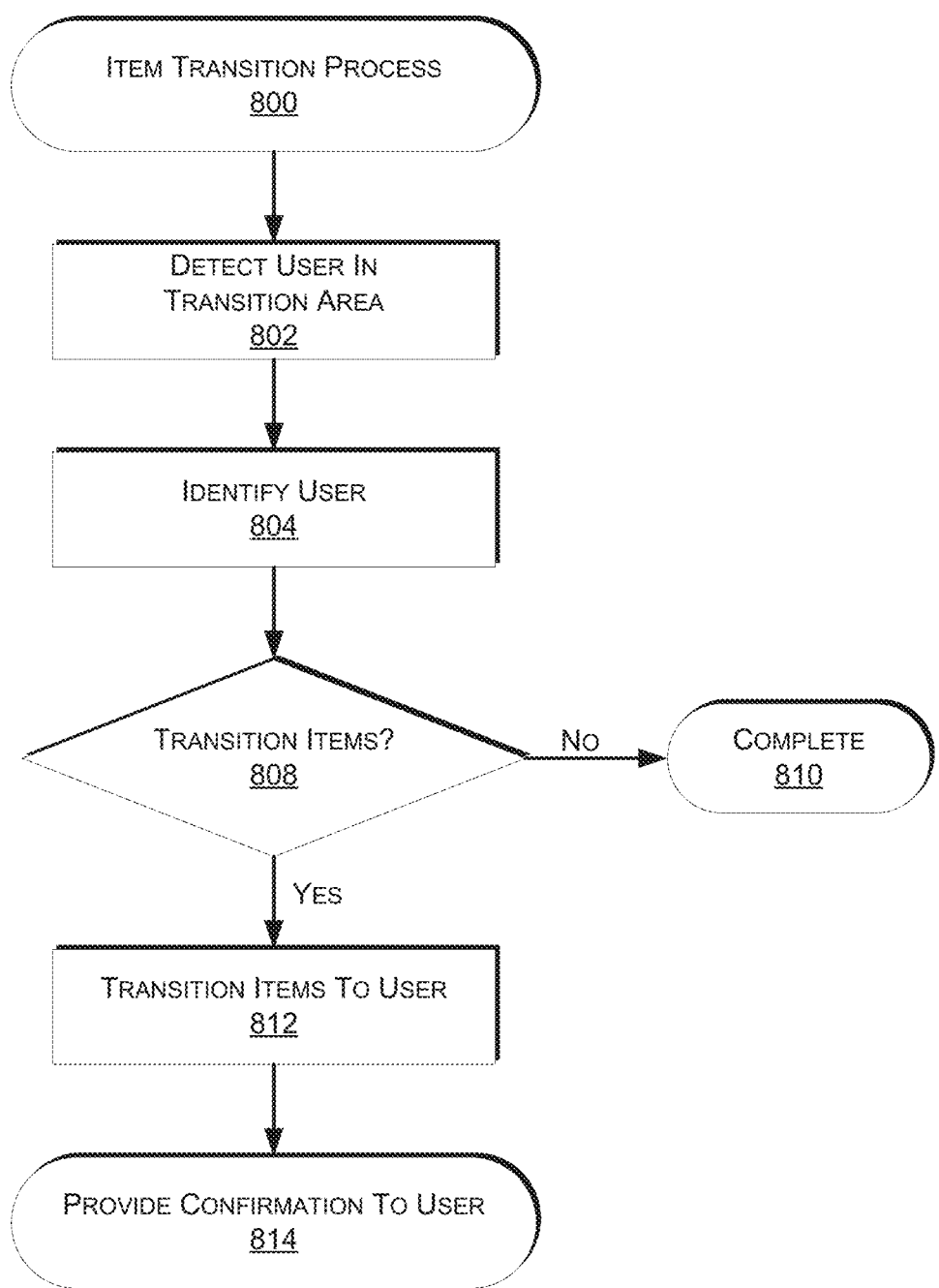
FIG. 8 depicts a flow diagram of an example item transition process, according to some implementations.

FIG. 8 depicts a flow diagram of an example item transition process 800, according to some implementations. The example process 800 begins by detecting a user entering or passing through a transition area, as in 802. For example, if the transition area is an exit of a materials handling facility, one or more cameras and/or other input devices, such as an RFID reader, may be located at or near the transition area and collect data (e.g., images, RFID tag identifiers) that is processed to determine that a user is entering and/or passing through the transition area. Alternatively, or in addition thereto, the position or location of the user may be monitored as the user progresses through the materials handling facility. It may then be determined that the user has entered or passed through a transition area based on the monitored position of the user.

Upon detecting a user entering and/or passing through a transition area, the user is identified, as in 804. As discussed above, various techniques may be used to identify a user. For example, a camera may capture an image of the user that is processed using facial recognition to identify the user. In some implementations, one or more input devices may collect data that is used to identify the user when the user enters the materials handling facility. The position of the user may also be monitored as the user moves about the materials handling facility. When the position of the user enters or passes through a transition area, the identity of the user is known because the position of the user and the identity of the user has been maintained.

The item identifier list associated with the user profile associated with the user and maintained in a data store by the inventory management system is also queried to determine the items identified on the item identifier list. Likewise, a determination may be made as to whether the items included on the item identifier list are to be transitioned, as in 808. As discussed above, transitioning the items may include charging a fee to the user for the purchase, rental, lease, etc., of the items, consumption of the items, decreasing an inventory count of the materials handling facility for the item, updating the user profile associated with the user to identify that the item has been transitioned to the user, transferring ownership and/or control of the items to the user, etc. In some implementations, the determination as to whether to transition the items may be determined based on data collected by input devices that is processed to determine whether the user has the items with them as they enter or pass through the transition area and/or if they have consumed or otherwise used the items. For example, if the user was placing picked items into a tote and then leaves the tote in the materials handling facility as they pass through the transition area, data may be collected by input devices and used to determine that the items are not to be transitioned to the user. In contrast, if the user passes through a transition area with the items identified on the item identifier list, data collected by the input devices may be used to determine that the items are to be transitioned to the user. In another example, if the user decides they do not want the items and/or the user is not going to take the items with them as they pass through the transition area, the user may identify that the items are not going through the transition area and are not to be transitioned.

In another example, the transition area may be a location within the materials handling facility where the user is transitioning the items to another entity or process. For example, if the transition area is a packing station, data may be collected by input devices and used to determine that the items are to be transitioned to the packing station and/or an agent at the packing station rather than to the user that picked the items.

If it is determined that the items are not to be transitioned, the example process 800 completes, as in 810. In some implementations, the item identifiers included on the item identifier list associated with the user may be removed from the item identifier list and/or the item identifier list may be disassociated from the user and/or a user profile associated with the user. For example, if the items are being transitioned to another entity (e.g., a packaging agent), the user profile associated with the user and stored in the user profile data store may be updated to remove an association between the user profile and the item identifiers and/or the item identifier list. Likewise, a data store may be updated to associate the item identifiers and/or the item identifier list with the user and/or the user profile associated with the user that is receiving the items as part of the transition.

If it is determined that the items are to be transitioned to the user, the user profile data store is updated to identify that the items identified on the item identifier list are transitioned to the user, as in 812. As discussed above, transition of items is done automatically in response to a determination that the user has entered and/or passed through a transition area. Likewise, the transition is done without stopping or otherwise delaying the user as they pass through the transition area. Transition of items to the user may include, but is not limited to, charging the user for the purchase, rental, lease, consumption, user, etc., of the items, transferring an ownership or control of the items to the user, decreasing a materials handling facility inventory count for the item(s), associating the items with the user and/or the user profile associated with the user, adding the item identifiers to a purchase history associated with the user, etc. In some implementations, a user profile associated with the user may be maintained by the inventory management system and, when the items are transitioned, the user profile is updated to identify the transition of the items and/or to charge a fee to the user for the items. For example, a credit card, debit card and/or other payment instrument may be associated with the user profile and, when the items are transitioned to the user, the payment instrument is utilized to charge the user for the transitioned items.

In some implementations, the transition of items may include other services. For example, if the user is transitioning an electronic device (e.g., an electronic book, or tablet), the electronic device may be associated with the user profile of the user and the user may be automatically signed up for one or more services. For example, the service may include providing the user with free access to electronic books, free or reduced shipping costs for ordered items, etc. In other implementations, additional incentives, discounts, etc. may also be included as part of the transition. For example, one or more credits, discounts or other services may be associated with the user profile as part of the transition of items and/or when it is determined that the user has entered or passed through a transition area.

In some implementations, the transition of items may occur when it is determined that the items are to be transitioned to the user. In other implementations, the transition may be delayed for a defined period of time and/or until the user has passed another location. For example, if the transition area is an exit from the materials handling facility, the transition may be delayed for approximately fifteen minutes and/or until the user has departed the area surrounding the materials handling facility. Delaying the transition may provide time to monitor and determine if the user has returned to the materials handling facility. If the user returns to the materials handling facility before the delay time or distance has been exceeded, the items may not be transitioned and the user may pick additional items that are added to the item identifier list associated with the user and/or place items back at inventory locations, resulting in item identifiers for those items being removed from the item identifier list. In such an example, the example process 800 may return to block 800 and continue.

In addition to transitioning the items to the user, the example process 800 may also provide a notification or confirmation to the user that the items have been transitioned to the user, as in 814. For example, the example process may generate and send an electronic communication to the user confirming the identity of the items transitioned to the user, the amount charged to the user for the items, the time of the transition, etc. In some implementations, the confirmation may be sent to the user as part of an electronic mail (e-mail) message. In other implementations, the confirmation may be provided to a portable device associated with the user and/or provided to an application executing on the portable device.

Figure 9:
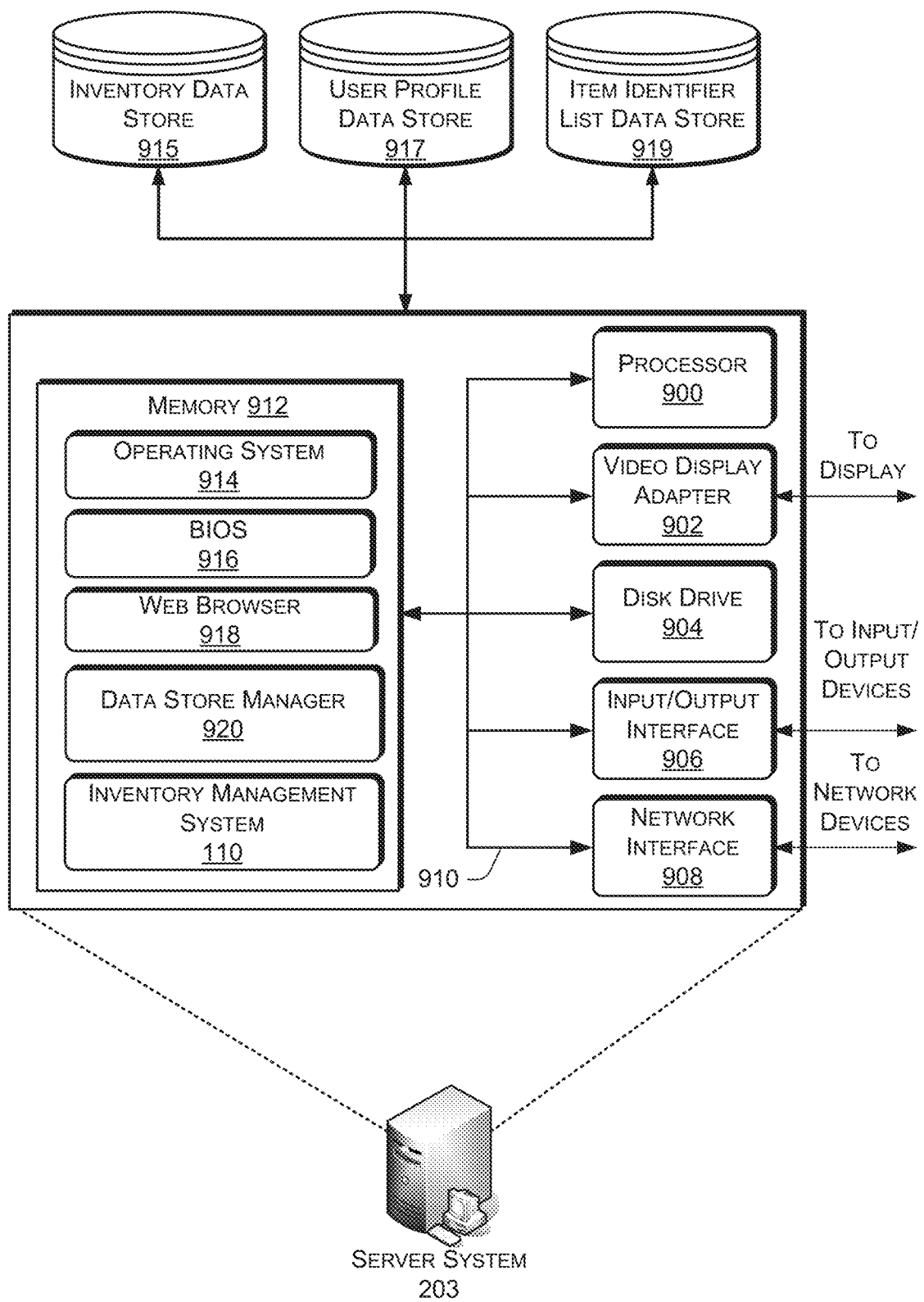
FIG. 9 is a block diagram of an illustrative implementation of a server system that may be used with various implementations, such as the remote computing resources.

FIG. 9 is a pictorial diagram of an illustrative implementation of a server system, such as the remote computing resource 203, that may be used in the implementations described herein. The remote computing resource 203 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display (not shown in FIG. 9) permitting an operator of the server system 203 to monitor and configure operation of the server system 203. The input/output interface 906 likewise communicates with external input/output devices not shown in FIG. 9, such as a mouse, keyboard, scanner, or other input and output devices that can be operated by an operator of the remote computing resource 203. The network interface 908 includes hardware, software, or any combination thereof, to communicate with other computing devices. For example, the network interface 908 may be configured to provide communications between the server system 203 and other computing devices via the network 202, as shown in FIG. 2.

The memory 912 generally comprises random access memory (RAM), read-only memory (ROM), flash memory, and/or other volatile or permanent memory. The memory 912 is shown storing an operating system 914 for controlling the operation of the server system 203. A binary input/output system (BIOS) 916 for controlling the low-level operation of the server system 203 is also stored in the memory 912.

The memory 912 additionally stores program code and data for providing network services that allow the inventory management system 150 to track items picked from inventory locations, placed into inventory locations and/or transitioned. Accordingly, the memory 912 may store a browser application 918. The browser application 918 comprises computer executable instructions, that, when executed by the processor 900, generate or otherwise obtain configurable markup documents such as Web pages. The browser application 918 communicates with a data store manager application 920 to facilitate data exchange between the inventory data store 915, the user data store 917 and/or the item identifier list data store 919.

As used herein, the term "data store" refers to any device or combination of devices capable of storing, accessing and retrieving data, which may include any combination and number of data servers, databases, data storage devices and data storage media, in any standard, distributed or clustered environment. The remote computing resource 203 can include any appropriate hardware and software for integrating with the data stores 915, 917, 919 as needed to execute aspects of the inventory management system 150.

The data stores 915, 917, 919 can include several separate data tables, databases or other data storage mechanisms and media for storing data relating to a particular aspect. For example, the data stores 915, 917, 919 illustrated include mechanisms for determining inventory information, user information, etc., which can be used to identify an item picked from an inventory location and/or placed into an inventory location. For example, the inventory data store 915 maintains information about inventory items. The information about inventory items may include the location of the inventory item in the materials handling facility, characteristics of the inventory item (e.g., size, shape, weight, dimensions, color, hazardous material, fragile), the price of the item, etc. The user data store 917 may maintain information about users. For example, a user profile may be established for each user that maintains information about the user. User information may include, but is not limited to, user identifying information (e.g., images of the user, height of the user, weight of the user) a user name and password, user biometrics, purchase history, payment instrument information (e.g., credit card, debit card, check card), purchase limits, and the like. The item identifier list data store 919 may include, for each user located in the materials handling facility, an item identifier list identifying each item picked by the user.

It should be understood that there can be many other aspects that may be stored in the data stores 915, 917, 919. The data stores 915, 917, 919 are operable, through logic associated therewith, to receive instructions from the remote computing resource 203 and obtain, update or otherwise process data in response thereto.

The memory 912 may also include the inventory management system 150, discussed above. The inventory management system 150 may be executable by the processor 900 to implement one or more of the functions of the remote computing resource 203. In one implementation, the inventory management system 150 may represent instructions embodied in one or more software programs stored in the memory 912. In another implementation, the inventory management system 150 can represent hardware, software instructions, or a combination thereof.

The remote computing resource 203, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing system, comprising:
one or more processors; and
a memory coupled to the one or more processors and storing program instructions that, when executed by the one or more processors, cause the one or more processors to at least:
 detect a presence of a user within a materials handling facility using first data collected by at least one of a plurality of input devices in the materials handling facility;
 detect a pick of an item, performed by the user, from an inventory location within the materials handling facility using second data collected by at least one of the plurality of input devices in the materials handling facility;
 identify, using the second data collected by at least one of the plurality of input devices in the materials handling facility, the item;
 associate an item identifier representative of the item with the user;
 determine, using third data collected by at least one of the plurality of input devices, that the user has passed through a transition area that is separate from the inventory location; and in response to determination that the user has passed through the transition area:
   update an inventory data store to decrease an inventory count of the item; and
   update a user profile data store to identify that the item has been transitioned to the user.

2. The computing system of claim 1, wherein the program instructions that, when executed by the one or more processors, further cause the one or more processors to at least:
   charge the user for a rental of the item, charge the user for a lease of the item, charge the user for a consumption of the item, charge the user for a purchase of the item, charge the user for a use of the item, transfer an ownership of the item to the user, transfer a control of the item to the user, or add the item identifier to a purchase history associated with the user.

3. The computing system of claim 1, wherein the update of the inventory data store and the update of the user profile data store are completed without affirmative input by the user.

4. The computing system of claim 1, wherein the program instructions that, when executed by the one or more processors, further cause the one or more processors to at least:
   identify, using fourth data collected by at least one of the plurality of input devices in the materials handling facility, the user when the user arrives at the materials handling facility.

5. The computing system of claim 1, wherein the third data collected by at least one of the input devices is at least one of an image of the user captured by an input device located near the transition area, position data of the user, or a RFID tag associated with the user detected by a RFID reader located near the transition area.

6. The computing system of claim 1, wherein the program instructions that, when executed by the one or more processors to cause the one or more processors to associate the item identifier with the user, further include program instructions that cause the one or more processors to, at least:
   update an item list associated with the user to include the item identifier, wherein the item list indicates at least items for which control is to be transitioned to the user.

7. The computing system of claim 1, wherein the third data is indicative of the user exiting the materials handling facility.

8. A computer-implemented method, comprising:
   detecting a user within a materials handling facility using first data collected by at least one of a plurality of input devices;
   detecting a pick of an item, performed by the user, from an inventory location within the materials handling facility using second data collected by at least one of the plurality of input devices in the materials handling facility;
   associating an item identifier representative of the item with the user;
   determining, using third data collected by at least one of the plurality of input devices, that the user has passed through a transition area located at the materials handling facility that is separate from the inventory location; and
   in response to determining that the user has passed through the transition area, updating a user profile data store to identify that the item has been transitioned to the user.

9. The computer-implemented method of claim 8, further comprising:
   determining, using the second data collected by at least one of the plurality of input devices in the materials handling facility, an identity of the item.

10. The computer-implemented method of claim 8, wherein the transition area is at an exit of the materials handling facility.

11. The computer-implemented method of claim 8, further comprising:
   charging the user for a rental of the item, charge the user for a lease of the item, charge the user for a consumption of the item, charge the user for a purchase of the item, charge the user for a use of the item, transfer an ownership of the item to the user, transfer a control of the item to the user, or add the item identifier to a purchase history associated with the user.

12. The computer-implemented method of claim 8, further comprising:
   updating an inventory data store to decrease an inventory count of the item.

13. The computer-implemented method of claim 8, further comprising:
   determining, based at least in part on a portable device in a possession of the user or an application executing on the portable device, a user profile of the user; and
   wherein updating the user profile data store includes updating the user profile to identify the item.

14. The computer-implemented method of claim 8, further comprising:
   determining that the user has the item as the user enters or passes through the transition area or that the user consumed or otherwise used the item; and
   charging a fee to an account for the item.

15. A system, comprising:
   one or more processors; and
   a memory coupled to the one or more processors and storing program instructions that, when executed by the one or more processors, cause the one or more processors to at least:
      detect a pick of an item, performed by a user, from an inventory location within a materials handling facility using first data collected by at least one of a plurality of input devices in the materials handling facility;
      associate an item identifier representative of the item with the user;
      determine, using second data collected by at least one of the plurality of input devices, that the user has passed through a transition area of the materials handling facility, wherein the transition area is separate from the inventory location; and
      in response to determination that the user has passed through the transition area, update a user profile data store to identify that the item has been transitioned to the user.

16. The system of claim 15, wherein the program instructions that, when executed by the one or more processors, further cause the one or more processors to at least:
   detect the user at the materials handling facility using first data collected by at least one of the plurality of input devices.

17. The system of claim 15, wherein the program instructions that, when executed by the one or more processors determine, based at least in part on third data collected by at least one of the plurality of input devices, an identity of the item.

18. The system of claim 15, wherein the update of the user profile data store is completed without affirmative input by the user.

19. The system of claim 15, wherein the program instructions that, when executed by the one or more processors, further cause the one or more processors to at least:
   send an electronic communication to the user indicating the item.

20. The system of claim 15, wherein the program instructions that, when executed by the one or more processors, further cause the one or more processors to at least:
   determine that the item is to be delivered to a location indicated by the user.

21. The computing system of claim 1, wherein the transition area is an exit of the materials handling facility.

* * * * *